United States Patent [19]

Bergen et al.

[11] 4,319,279

[45] Mar. 9, 1982

[54] TELEVISION IMAGING PANEL

[75] Inventors: Franciscus H. M. Bergen; Marnix G. Collet; Leendert J. van de Polder, all of Eindhoven, Netherlands

[73] Assignee: U.S. Philips Corporation, New York, N.Y.

[21] Appl. No.: 154,562

[22] Filed: May 29, 1980

[30] Foreign Application Priority Data

Jun. 14, 1979 [NL] Netherlands ............... 7904654

[51] Int. Cl.³ .............................................. H04N 3/14
[52] U.S. Cl. .................................. 358/213; 250/211 J; 250/578; 307/221 D; 307/304
[58] Field of Search ............... 358/213; 307/221 R, 307/221 C, 304, 311; 250/211 J, 211 R, 578

[56] References Cited

U.S. PATENT DOCUMENTS 3,932,775  1/1976  Kosonocky .................... 358/213
4,220,976  9/1980  Koch ............................. 358/213

Primary Examiner—Jin F. Ng
Assistant Examiner—Edward L. Coles
Attorney, Agent, or Firm—Thomas A. Briody; William J. Streeter; Laurence A. Wright

[57] ABSTRACT

An imaging panel comprising a buffer register inputs of which are connectable to the outputs of one of the rows or elements or connectable one after the other to outputs of several rows of the elements and whose outputs are coupled to the panel output. The buffer register is connected to a control circuit for shifting in each first field period of the interlaced picture each recorded information of an element row directly and fully, and for shifting in each second field period of the interlaced picture half of each recorded information of an element row, the other half being retained in the buffer register for confining it to half of the information to be shifted of the next row of elements.

7 Claims, 7 Drawing Figures

TELEVISION IMAGING PANEL

The invention relates to a television imaging panel comprising information-recording and storage elements, respectively, arranged in rows and columns and having a control circuit for consecutively transferring, row after row, the information to outputs of the rows of elements, an output of the imaging panel carrying a picture signal which corresponds with a picture which is assembled from a first and a second field in an interlaced manner.

BACKGROUND OF THE INVENTION

Such an imaging panel is disclosed in the Netherlands patent application No. 7800610, which has been laid open to public inspection. This application describes that in a certain construction of the imaging panel, namely as a charge injection device, an interlaced picture signal can be obtained by reading the rows of elements in a certain manner. In the first field the element rows were read, each separately, in the numerical order 1, 2, 3 etc. to n. In the second field each element row is read twice and that simultaneously and combined, first with the preceding row and thereafter with the subsequent row. In this manner a picture signal assembled from the information of the element rows 1+2, 2+3, 3+4 etc. to (n−1)+n is obtained in the second field, in addition to which the signal value is halved. It appears that signal averaging in the second field produces information located between the rows of the first field, which corresponds with an interlaced picture. The requirement that in the imaging panel the element rows must be read twice in the second field results in the use of an imaging panel with non-destructive read-out of the element rows. This non-destructive read-out is a feature of charge injection devices which are operated with the so-called parallel injection in which the functions of signal charge detection and injection are separated. With imaging panels assembled with charge transfer devices a destructive read-out is effected in which signal charge detection is combined with restoring a reference charge. With panels of that type the described read-out mode with a repeated reading of the element rows cannot be used.

It is an object of the invention to provide an imaging panel wherein the rows of elements are consecutively read, in a non-interlaced manner, whereas an interlaced picture signal is obtained at the output of the imaging panel, independent of the fact whether the element rows are read non-destructively or not.

SUMMARY OF THE INVENTION

An imaging panel according to the invention is characterized in that the panel comprises a buffer register inputs of which are connectable to the outputs of one of the rows of elements or connectable one after the other to outputs of several rows of the elements and whose outputs are coupled to the panel output, this buffer register being connected to a control circuit for shifting in each first field period of the interlaced picture each recorded information of an element row directly and fully, and for shifting in each second field period of the interlaced picture half of each recorded information of an element row, the other half being retained in the said buffer register for combining it to half of the information to be shifted of the next row of elements.

The invention is based on the recognition of the fact that the use of the buffer register accomplishes that in the first field of information of the element rows 1, 2, 3, 4, etc. and in the second field the information of the element rows (1+2)/2, (2+3)/2, (3+4)/2 etc. become available.

In order to realize a television imaging panel wherein the rows of elements and the buffer register are included in one sole semiconductor body the imaging panel according to the invention is characterized in that the buffer register comprises a semiconductor charge transfer device, there being present at least four buffer register stages in series between each input which is connected to an output of the row of elements, and each output of the buffer register.

Of the number of at least four buffer register stages the input stage of the buffer register should be formed thus that charge transfer to the inside, but no return charge transfer, to the outside, can occur. This can be realized by providing in a portion of the semiconductor body of a certain semiconductor type, for example N-type, a zone of a more highly doped semiconductor material (n) underlying the control electrodes for the register stages and to do the same, but only for fifty percent, under the control electrode of the input stage. As a consequence, negative charge can be fed into the input stage, but no return feed is possible.

An embodiment of an imaging panel which does not require a specifically formed input stage of the buffer register, is characterized in that the buffer register has five register stages in series, which are connected to the control circuit.

An imaging panel with which it is achieved that a signal is split as closely as possible into the equal halves, is characterized in that the second and fourth buffer register stages of the series of buffer register stages have been constructed symmetrically relative to the centre, third register stage.

An imaging panel wherein the different reading modes can be realised in a simple way in consecutive field periods is characterized in that the control circuit for the buffer register comprises inputs for receiving a line and a field synchronizing signal, the input for the line synchronizing signal being connected to outputs of the control circuit via a first delay device and logic gates, one of these outputs being connected to an input of a second delay device, outputs of which are connected to the outputs of the control circuit, the input for receiving the field synchronizing signal being connected to an output of the control circuit via a frequency division circuit, having a division factor equal to two, and being arranged in series with a logic gate an input of which is connected to an output of the second delay device.

A further, simple construction is characterized in that the first delay device is constructed as a series-in, parallel-out shift register.

A different, further, simple construction is characterized in that the second delay device comprises series-arranged flip-flops.

BRIEF DESCRIPTION OF THE DRAWINGS

The invention and its advantages will be further explained by way of non-limitative example with reference to the following drawings, wherein.

DESCRIPTION OF THE PREFERRED EMBODIMENTS

Figure 1:
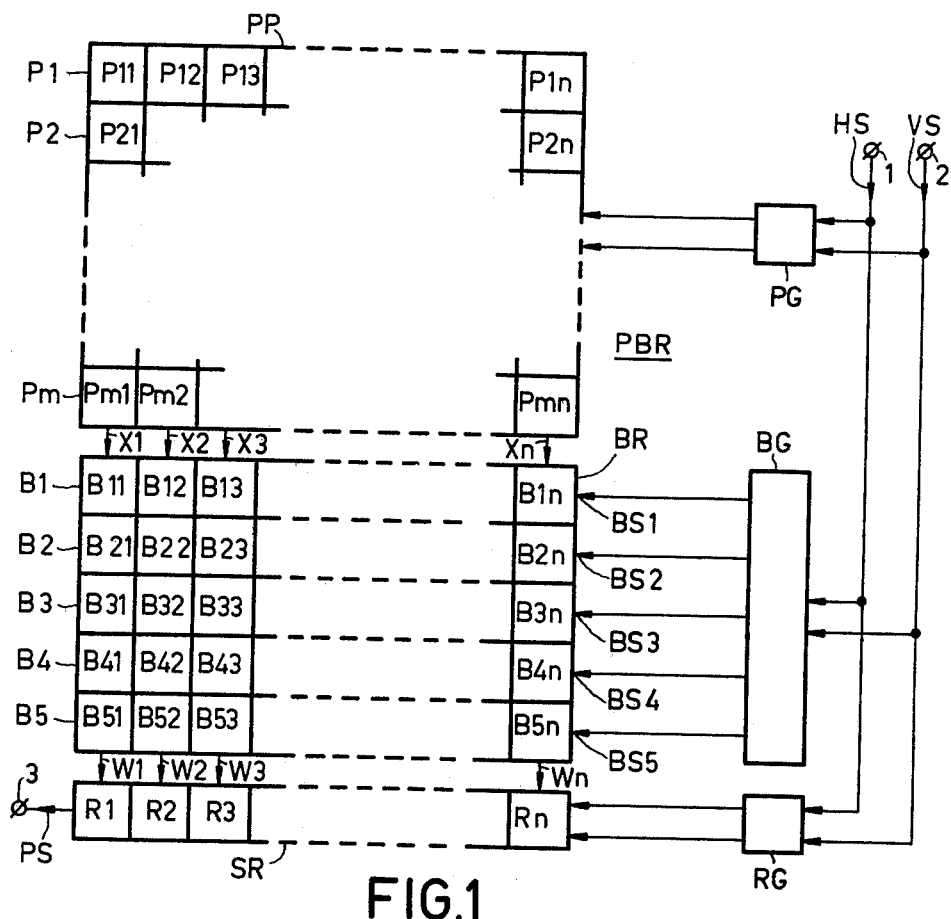
FIG. 1 shows schematically a construction of a television imaging panel according to the invention.

Referring to FIG. 1 there is shown a television imaging panel PBR comprising an information, recording and storage section PP, a buffer register BR and a parallel-in, series-out shift register SR. Furthermore, control circuits PG, BG and RG for the imaging section PG and the registers BR and SR, respectively, may also form part of the imaging panel PBR or it may be of a separate construction. A line synchronizing signal HS and a field synchronizing signal VS are applied to the control circuits PG, BG and RG, these signals being applied to inputs 1 and 2. The imaging panel PBR comprises an output 3 for the release of a television picture signal, this output 3 being connected to the series output of the shift register SR.

The imaging section PP of the panel PBR has rows P1; P2; ... Pm of elements P11, P12, P13 ... P1n; P21 ... P2n; Pm1, Pm2 ... Pmn, these elements further having been arranged in columns P11, P21 ... Pm1; P12 ... Pm2; P1n, P2n ... Pmn. The specific construction of the elements P11 ... Pmn and the manner in which the recorded information is obtained from the elements P11 ... Pmn is irrelevant to the invention. For example, the imaging section of PP may operate as a charge transfer device (CTD) which is controlled in known manner in a single phase or a multi-phase mode by means of the control circuit PG. The charge transfer is then effected into the column direction, shifting occurring through the next elements or via a separate transfer line bypassing the subsequent elements, as described in the Netherlands Patent Application No. 7610350. Furthermore, in a different embodiment, the imaging section PP may have been constructed in known manner with a cross-bar system. The only condition to be satisfied is that the information coming from the rows of elements P1, P2 ... Pm, after having been stored or not having been stored in separate storage elements, must become available, one after the other, at the ouputs X1, X2 ... Xn of the imaging section PP under the control of the control circuit PG.

According to the invention the outputs X1, X2, X3 . . . Xn are connected to parallel input W1, W2, W3 ... Wn of the shift register SR via the buffer register BR. The buffer register BR comprises five rows B1, B2, B3, B4, B5 of buffer register stages B11 ... B1n, B21 ... B2n, B31 ... B3n, B41 ... B4n and B51 ... B5n. Five buffer register stages have been arranged between each output X1 ... Xn of the imaging-section PP and each input W1 ... Wn of the shift register SR, for example B11, B21, B31, B41 and B51 in series between the output X1 and the input W1. The rows B1, B2, B3, B4 and B5 of the buffer register stages are controlled in a manner still to be described hereafter by means of signals BS1, BS2, BS3, BS4 and BS5, respectively, originating from the control circuit BG. The inputs W1, W2, W3 . . . Wn of the shift register SR are connected to shift register stages R1, R2, R3 ... Rn, respectively. The information received in parallel with the inputs W1, W2, W3 ... Wn is sequentially released at the output under the control of the control circuit RG in the shift register SR, which may have been constructed as a single phase or a multi-phase controlled charge transfer device.

Without the use of the buffer register BR with its specific control by means of the control signals BS1 . . . BS5 the output signal PS of the shift register SR would contain, one after the other, the information originating from the recording elements P11, P12 ... P1n; P21 ... P2n; Pm1 ... Pmn. This means that the picture signal PS would produce a non-interlaced picture on display, each field thereof being assembled from a plurality of m lines. As will be described hereafter, the use of the buffer register BR, the control of the imaging section PP being unchanged, achieves that on display the picture signal PS would give an interlaced picture assembled from two television fields, each having m lines, resulting in an interlaced picture having 2m lines.

Figure 2:
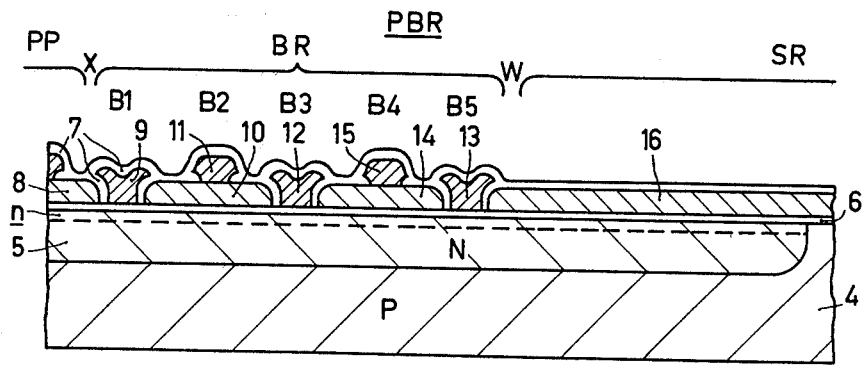
FIG. 2 shows a cross-sectional view of a construction, integrated in a semiconductor body, of a buffer register included in accordance with the invention in the panel shown in FIG. 1.

FIG. 2 shows a cross-sectional view of the buffer register BR, namely transverse to the the direction of the rows B1, B2, B3, B4 and B5 of the buffer register stages, that is to say into the direction of the columns. In the construction shown by way of example in FIG. 2 the buffer register BR forms part of the panel PBR together with the imaging section PP and the shift register SR. The panel PBR includes a semiconductor body 4 which is, for example, of the P-type semiconductor material. The semiconductor body 4 comprises a zone 5 of the opposite, for example N-type, semiconductor material, a portion n of which is doped to a higher extent. The body 4 and the zone 5 are coated with an insulating layer 6. Electrodes which are insulated from one another by an insulating layer 7 have been provided on the insulating layer 6, the supply of information from the imaging panel PP to the buffer register BR taking place under the control of a control electrode 8. Reference numeral 9 denotes a control electrode for the row B1 of buffer register stages B11, B12, B13 ... B1n, the control signal BS1 being applied to this control electrode 9. The row B2 of buffer register stages B21, B22, B23 ... B2n has a dual control electrode, reference numeral 10 denoting a wide electrode and reference numeral 11 denoting a narrow electrode. The control electrode (10, 11) is of a double construction in view of the use of a specific technology, the electrode 10 having been made of a highly resistive and the electrode 11 of a low resistive material. For the data as regards the kinds of material, layer dimensions, electrodes etc. for a semiconductor charge transfer device (4-8, 9-15) formed thus as a buffer register, reference is made to the above-mentioned patent application.

The rows B3 and B5 of buffer register stages B31 . . . B3n and B51 ... B5n are again of a construction having a single control electrode 12 and 13, respectively, and the row B4 of buffer register stages B41 ... B4n is of a construction having a dual control electrode (14, 15). The width of the electrodes 10 and 14 exceeds the width of the electrodes 9, 12 and 13, the reason being that the buffer register stages B21 ... B2n and B41 ... B4n operate, essentially, as storage stages.

Referring to FIG. 2, reference numeral 16 denotes a control electrode which is part of the shift register SR. As the construction of the shift register SR, whether it is a single or a multi-phase controlled charge transfer device, is irrelevant to the invention it is not further discussed here, whereas reference is made to the above-mentioned Patent Specification for a possible construction.

Figure 3:
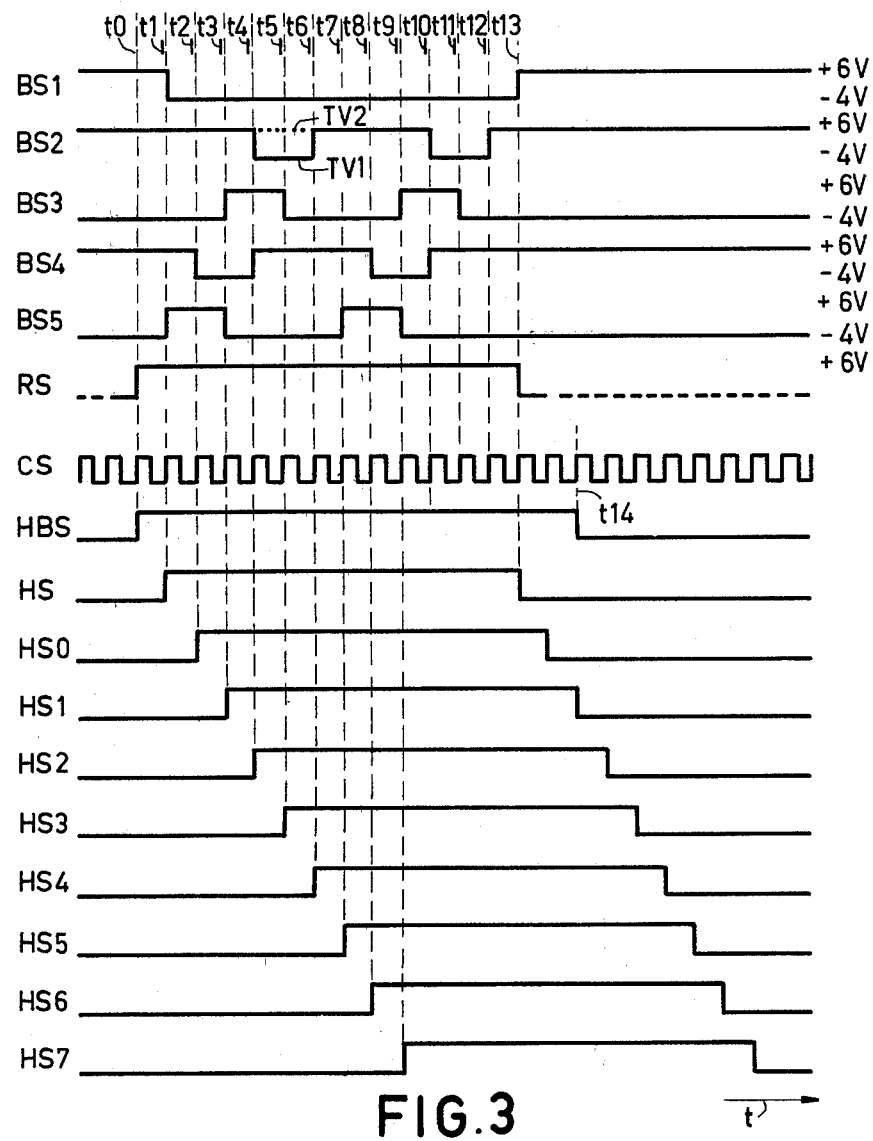
FIG. 3 shows some signals of line frequency and a clock signal as a function of the time, which occur with a panel shown in FIG. 1.

FIG. 3 shows some signals of line frequency as a function of the time t which are partially indicated at the panel PBR of FIG. 1, namely the control signals BS1, BS2, BS3, BS4 and BS5 for the rows B1, B2, B3, B4 and B5 of buffer register stages, these control signals being produced by the control circuit BG, a detailed description of which will be described with reference to FIG. 7. RS denotes a signal which is operative at the shift register SR. As the signal RS is only important, to explain the operation of the buffer register BR, between two instants t0 and t13 and must then have a positive value, only this signal portion has been shown by means of solid lines. A dashed line indicates that there the signal RS may have any value, as this is irrelevant to the invention.

Figure 7:
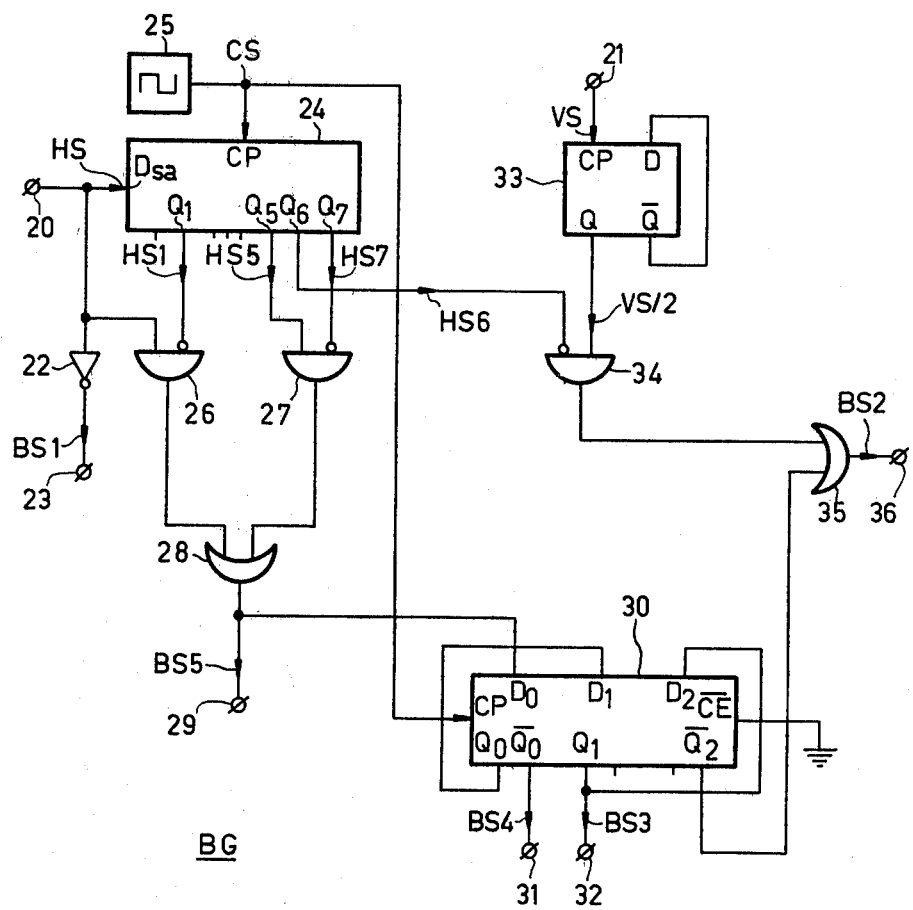
FIG. 7 shows an embodiment of a control circuit suitable for controlling the buffer register.

In FIG. 3 CS denotes a clock signal which will be further explained during the description of the circuit shown in FIG. 7. HBS denotes a signal which is the line blanking signal as defined in a television standard with a given duration between the instants t0 and t14. HS denotes a line synchronizing signal which is operative as a camera synchronizing signal and has a duration which is dependent of the camera construction, HS0, HS1, HS2, HS3, HS4, HS5, HS6 and HS7 denote signals which are derived from the signal HS by means of a delay device still to be described with reference to FIG. 7.

Figure 4:
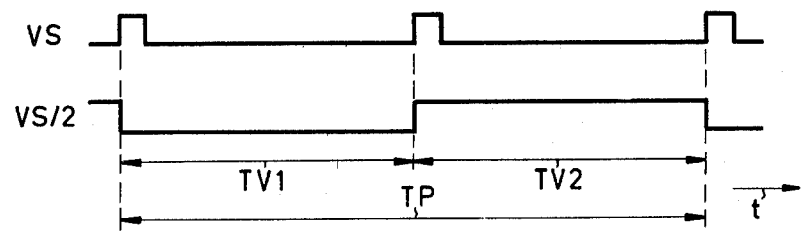
FIG. 4 shows also a signal of field and frame or picture frequency.

In FIG. 4 VS denotes a field synchronizing signal and VS/2 a signal of picture or frame frequency derived therefrom. TV1 and TV2 denotes two consecutive field periods which together form a picture or frame period TP. In response to the signal VS/2 of frame frequency the signal BS2 of FIG. 3 varies differently in the first and the second field periods TV1 and TV2. In the first field period TV1 the signal BS2 has a descending pulse in situ of where in the second field period TV2 the signal continues without change (shown by means of a dotted line). At the signals BS1 ... BS5 it is indicated that they may have one out of two voltage values of +6 V and −4 V, which is in conformity with the embodiment of the buffer register BR shown in FIG. 2. The signal RS is then assumed to have also the value +6 V between the instants t0 and t13. As the voltage values of the further signals are of no importance for a further understanding of the invention they are not further specified.

Figure 5:
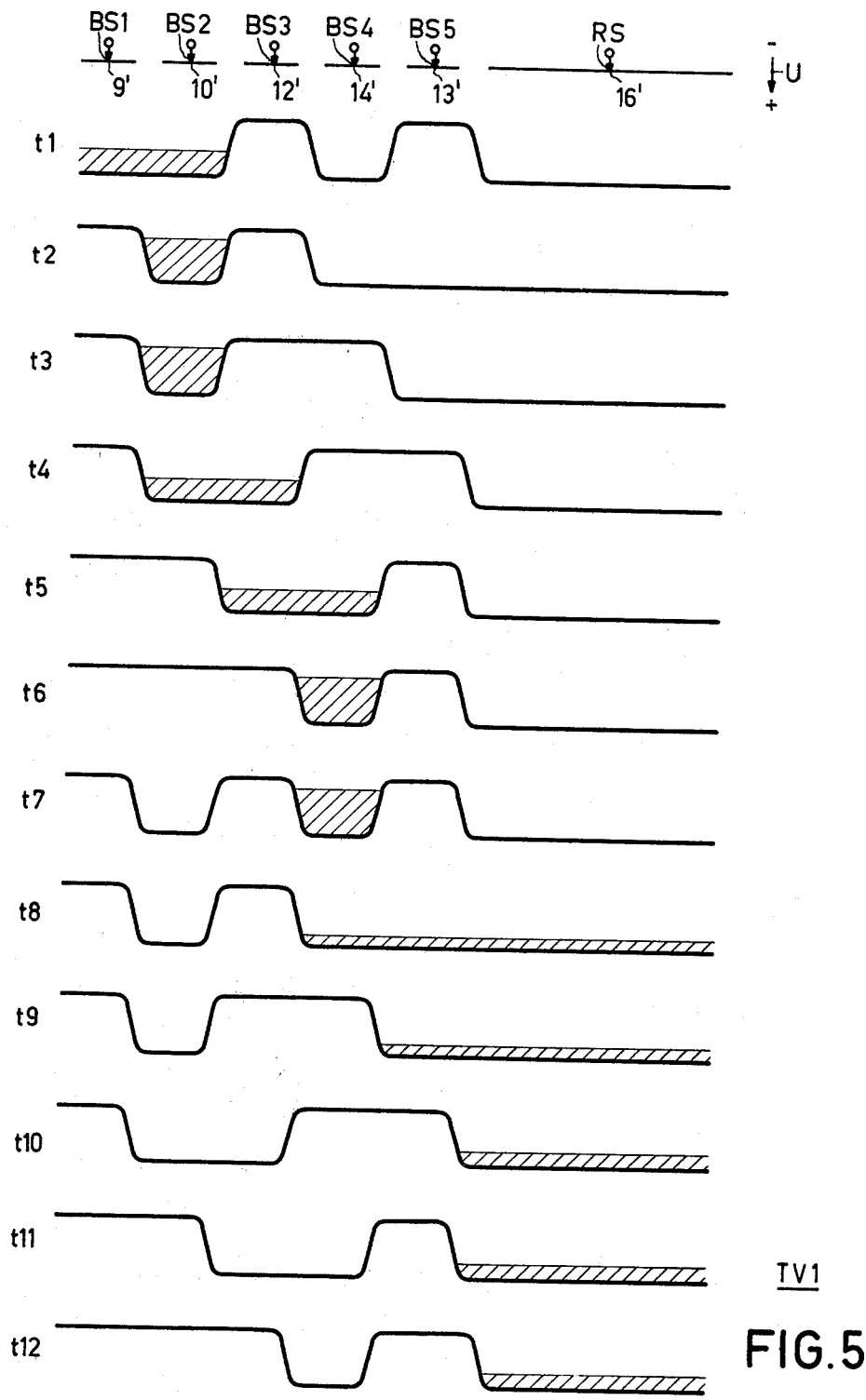
FIG. 5 shows, starting from the signals shown in FIGS. 3 and 4, potential variations and the charge transfer in and near the buffer register during a first television field period.
Figure 6:
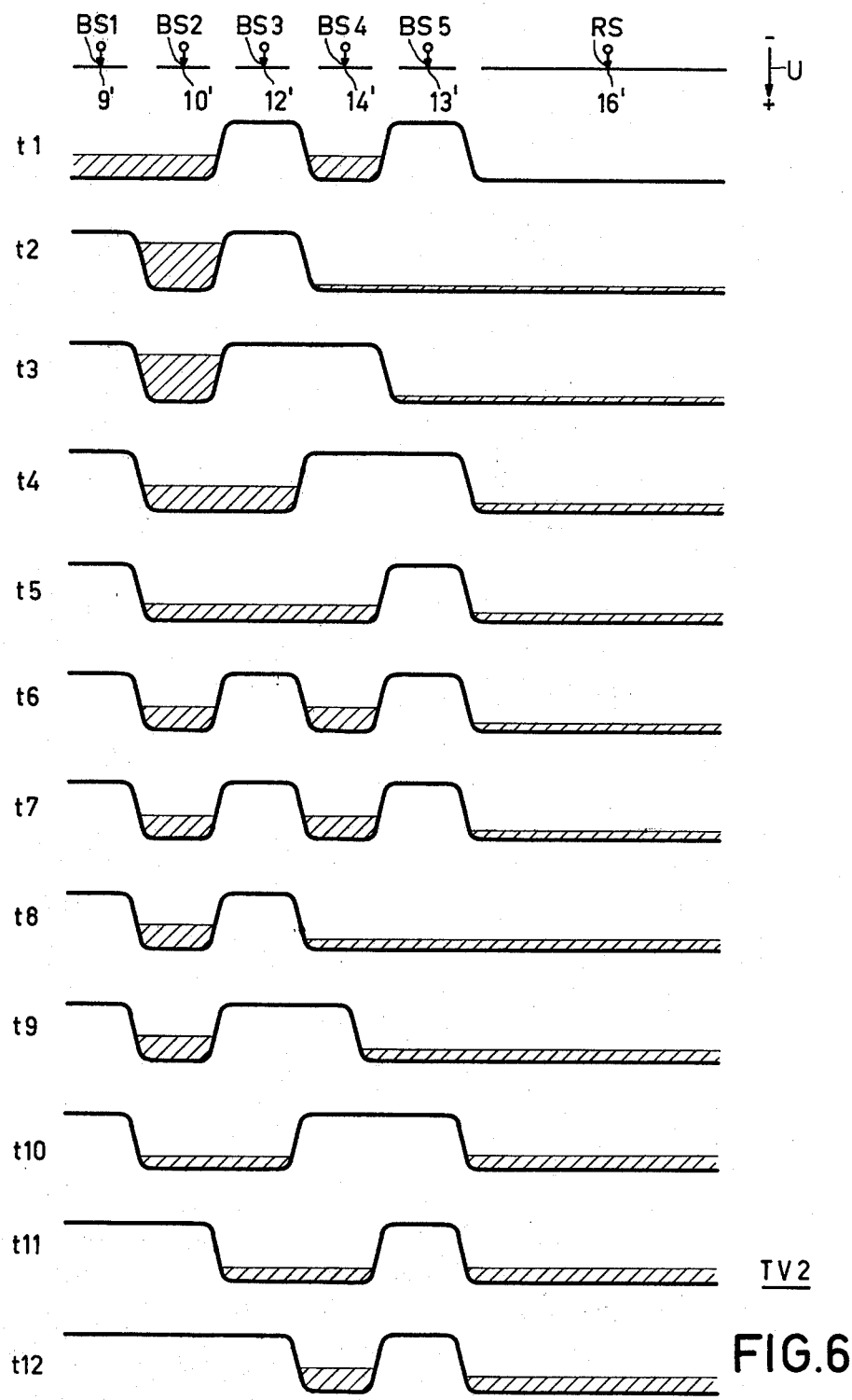
FIG. 6 corresponds to FIG. 5 for a next, second television field period.

To explain the operation of the buffer register BR FIGS. 5 and 6 show some potential variations such as they are present under the electrodes 9, (10, 11), 12, (14, 15) and 13 shown in FIG. 2, in the zone 5 of the semiconductor body 4 under the control of signals shown in FIGS. 3 and 4. For simplicity of the description the electrodes 9', 10', 12', 14' and 13' have been given the same width in FIGS. 5 and 6, the electrode 16' being shown with a width equal to three times the pitch of the electrodes 9', 10', 12', 14' and 13'. In addition, to explain the charge transfer, the potential variation has been plotted below the electrodes 9', 10', 12', 14', 13' and 16', the positive value being shown below and the negative value being shown above, as denoted by U in FIGS. 5 and 6. During transfer of the negative charge (shown by means of a hatched portion in FIGS. 5 and 6), which is associated with the fact that N-type semiconductor material has been chosen for the zone 5 of FIG. 2, this negative charge will flow to the potential which is lowest in the drawing.

FIG. 3 shows the instants t1 to t12, inclusive, which occur just prior to a signal change in the control signals BS1, BS2, BS3, BS4, BS5 and RS. FIG. 5 shows the potential variations as they occur in the first field period TV1 at the instants t1 to t12, inclusive, the positive voltage of +6 V in a control signal of FIG. 3 producing the potential value shown lower in FIG. 5. At the instant t1 it holds that the hatched negative charge below the electrodes 9' and 10' is obtained from the imaging section PP. Thereafter, shortly after the instant t1, the voltage at the electrode 9' is adjusted from +6 V to −4 V, causing all charge to be transferred to under the electrode 10', resulting in the potential variation shown in FIG. 5 at the instant t2. After the potential variations shown at the instants t3, t4 and t5, a potential variation at the instant t6 results in that the full, negative charge is transferred from electrode 10' (instant t2) to under the electrode 14'. Shortly after the instant t7, the +6 V voltage is present at all three electrodes 14', 13' and 16', causing the negative charge to be present thereunder, uniformly distributed. Shortly after the instants t8 and t9 a further charge transfer is effected, the full negative charge being present under the electrode 16' at the instant t10. Until the instant t13 of FIG. 3 the charge is retained there and after this instant the further charge transfer in the shift register SR can be effected in known manner.

It will be apparent from FIG. 5 that in the first field period TV1 the information coming from the imaging section PP is directly and fully shifted through the buffer register BR. In response thereto the shift register SR will supply the picture signal PS having in the first field period TV1, one after the other the information deriving from the element rows P1, P2 ... Pm.

For the potential variations shown in FIG. 6 in the second field period TV2 it holds that until the instant t4 they are identical to the potential variations shown in FIG. 5. Shortly after the instant t4 no descending pulse occurs anymore in the signal BS2 of FIG. 3, but the +6 V positive voltage remains on the electrode 10'. This results in that at the instant t5 the negative charge is present under the electrodes 10', 12' and 14'. Shortly after the instant t5 the electrode 12' is impressed with the voltage −4 V, in response to which the negative charge flows from under the electrode 12' and the potential variation and charge condition shown at the instant t6 are obtained. It appears that the charge present at the instant t2 under the electrode 10' is split into two at the instant t6 and is present, separated, under the electrodes 10' and 14'. The (half) charge under the electrode 10' is retained there until the instant t9 and shortly after the instant t9 charge transfer starts whereafter the (half) charge is present under the electrode 14' at the instant 12. The (half) charge present at the instant t6 under the electrode 14' is combined, shortly after the instant t7, with the (half) charge present at this instant under the electrode 16', this charge having been shifted from under the electrode 14' shortly after the instant t1. It appears that in the second field period TV2 the charge information coming from an elements row, for example P2, of the imaging section PP is divided into two, shortly after the instant t5, one half being shifted on to the electrode 16' and being combined there with half the charge information of the preceding element row, the row P1 in this example, and of the charge which was retained under the electrode 14' to be combined there with half the charge information of that row when the charge information of the next element row, in this example the row P3, is processed. After the shifting in the shift register SR the result is that in the picture signal PS in the second field period TV2 there is present, one after the other, the information coming from the element rows (P1+P2)/2, (P2+P3)/2, (P3+P4)/2, ... etc. It appears that the signal averaging action produces in the second field information located between the rows of the first field which corresponds to an interlaced picture.

From the described operation of the buffer register BR, which is described as having five registers in series, it might be derived that not less than five stages must be provided for the charge halving and retaining operation (instant t6 of FIG. 6). However, this is not so, the minimum number of stages may be equal to four when the buffer register BR shown in FIG. 2 is technologically adapted, instead of a control by way of electrode 9'. The electrode 9 may then be through-connected to the electrode 10, the n layer, which was doped to a higher extent, only extending under the electrodes 10, 12, 14, 13 and 16. In this manner there is obtained a non-return valve action so that the negative charge can flow from under the electrode 8 to the electrode 10 via the electrode 9, but cannot flow back.

To perform a correct charge halving shortly after the instant t5, shown in FIG. 6, it is a requirement that the configuration of the (second) buffer register stages B21, B22, B23 ... B2n and the (fourth) buffer register stages B41, B42, B43 ... B4n (FIG. 1) is symmetrical to the highest possible extent relative to the centre (third) buffer register stages B31, B32, B33 ... B3n. During charge transfer there should be no preference for forward or backward shift of the charge. In addition, the potential under the electrode 12' must definitely not be less positive than the potential under the electrodes 10' and 14'.

From the foregoing it will be apparent that interlacing can be obtained in a simple way by providing the buffer register BR with only four or five register stages arranged in series, the control thereof being effected in the first and the second television field periods, there only being a difference of one sole pulse (t4, t5, t6) in one of the control signals (BS2). The described simple structure and control realizes interlacing for which only a limited number of components must be added.

FIG. 7 shows a detailed construction of the control circuit BG for the buffer register BR, for the generation of the control signals BS1, BS2, BS3, BS4 and BS5, shown in FIG. 3. The circuit BG comprises two inputs 20 and 21 to which the line and field synchronizing signals HS and VS, respectively, are applied. Via an inverter 22 the input 20 is connected to an output 23, causing this input to carry the signal HS with an inverted phase, it holding that BS1=$\overline{HS}$. For simplicity, FIG. 7 shows no output amplifiers so that the above-mentioned equation is valid for the signal variation but not for the signal amplitude and signal values, respectively.

The input 20 is connected to an input ($D_{sa}$) of a series-in, parallel-out shift register 24, which operates as a delay device. The shift register 24 may, for example, be the "Signetics" shift register 54/57 Series "164". This shift register is a 8-bit register comprising 8 outputs $Q_0$ to $Q_7$, inclusive, whose outputs $Q_1$, $Q_5$, $Q_6$ and $Q_7$ are utilised for further signal processing. The shift register 24 comprises a clock signal input CP connected to the output of a generator 25 producing the clock signal CS. FIG. 3 shows, as a function of the time, the signals HS0, HS1 to HS7, inclusive, these signals being present at the outputs $Q_0$ to $Q_7$, inclusive, of the shift register 24 of FIG. 7. The output $Q_1$ carrying the signal HS1 of FIG. 3 is connected to an inverse input of an AND-gate 26, another input of which is connected to the input 20 carrying the signal HS. The output $Q_5$ and $Q_7$, respectively, carrying the signals HS5 and HS7, respectively, is connected to an input and an inverse input, respectively, of an AND-gate 27. The outputs of the gates 26 and 27 are connected to inputs of an OR-gate 28 the output of which is connected to an output 29 of the control circuit BG carrying the signal BS5. The logic gates 26, 27 and 28 process the signals thus that the first and the second, respectively, ascending pulse in the signal BS5 is supplied by the signals HS and HS1 (inverse) and HS5 and HS7 (inverse), respectively, in accordance with the logic relation HS·$\overline{HS1}$+HS5·$\overline{HS7}$.

The output of the gate 28 is connected to an input ($D_0$) of a multiple D-flip-flop circuit 30, which operates as a delay device. The circuit 30 may, for example, be the "Signetics" quadruple D-flip-flop circuit with clock release 54/74-Series "379". A clock signal input CP of the circuit 30 is connected to the output carrying the clock signal CS of the generator 25. An (inverse) clock release input $\overline{CE}$ of the circuit 30 is connected to ground. The $Q_0$-output of the circuit 30 is connected to the $D_1$-input thereof and the $Q_1$-output to the $D_2$-input. The inverse $\overline{Q_0}$-output of the circuit 30 is connected to an output 31 of the control circuit BG which, as a result thereof, carries the signal BS4 shown in FIG. 3. The signal BS4 is derived from the signal BS5 by delaying the latter for a clock pulse period and to reverse its phase.

The $Q_1$-output of the circuit 30 is connected to an output 32 of the control circuit BG which, as a result thereof, carries the signal BS3 shown in FIG. 3. The Signal BS3 is derived from the inverse signal $\overline{BS4}$ present at the $Q_0$-output by delaying it for a clock pulse period.

The derived signals BS1, BS3, BS4 and BS5 are the same for each television field period, which does not hold for the signal BS2 still to be derived and varying as shown in FIG. 3 for first field periods TV1 and second field periods TV2. The input 21 with the field synchronizing signal VS is connected to a clock signal input CP of a D-flip-flop circuit 33, which operates as a frequency division circuit having a division factor equal to two. To that end the $\overline{Q}$-output of the circuit 33 is connected to the D-input. The Q-output carrying the signal VS/2 of field frequency shown in FIG. 4 is connected to an input of an AND-gate 34 an inverse input of which is connected to the $Q_6$-output of the shift register 24, which carries the signal HS6 of FIG. 3. The output of the gate 34 is connected to the input of an OR-gate 35, to another input of which the $\overline{Q_2}$-output of the D-flip-flop circuit 30 is connected. The output of the gate 35 is connected to an output 36 of the control circuit BG which carries the signal BS2.

In the first field period TV1 the signal VS/2 has the logic value 0 (FIG. 4) so that the AND-gate 34 is conductive and carries the logic 0 at the output. The circuit 30 supplies the signal BS3 delayed for a clock pulse period and whose phase is reversed, the result being that the signal BS2 shown in FIG. 3 for the first field period TV1 is released via the gate 35.

In the second field period TV2 the signal VS/2 has the logic value 1 in response to which the gate 34 is released and the output carries the inverse signal $\overline{HS6}$. As a result thereof the logic 1 remains present in the signal BS2 between the instants t4 and t6 of FIG. 3 when the logic 0 occurs at the $Q_2$-output of circuit 30. The logic 0 in the inverse signal $\overline{HS6}$ does not affect the signal BS2 which has a descending pulse at the instant t10, t11 and t12. Alternatively, the signals HS5 and HS7 might be utilized instead of the signal HS6.

If it is desired to have the described first and second field period coincide with the field periods defined in a television standard, this can be realized by providing the flip-flop 33, which operates as frequency division circuit with a resetting means which is controlled with the frame frequency.

What is claimed is:

1. A television imaging panel comprising: information-recording and storage elements respectively arranged in rows and columns, a control circuit for transferring row after row the information to outputs of the rows of elements, an output of said imaging panel carrying a picture signal which corresponds with a picture which is assembled from a first and a second field in an interlaced manner, said panel also comprising a buffer register inputs of which are connectable in a first instance to the outputs of one of the element rows and in a second instance connectable one after the other to the outputs of several element rows and whose outputs are coupled to the panel output, a control circuit, said buffer register being connected to said control circuit for shifting in each first field period of the interlaced picture each recorded information of an element row directly and fully, and for shifting in each second field period of the interlaced picture half of each recorded information of an element row, the other half being retained in the said buffer register for combining it to half of the information to be shifted of the next row of elements.

2. A television imaging panel as claimed in claim 1, wherein said buffer register comprises a semiconductor charge transfer device, there being present at least four buffer register stages in series between each buffer register input, which is connected to an output of the element row, and each buffer register output.

3. A television imaging panel as claimed in claim 2, wherein said buffer register has five register stages in series, which are connected to said control circuit.

4. A television imaging panel as claimed in claim 3, wherein the second and fourth buffer register stages of the series of buffer register stages have been constructed symmetrically relative to the central, third register stage.

5. A television imaging panel as claimed in claim 1 wherein said control circuit for the buffer register comprises inputs for receiving a line and a field synchronizing signal, the input for the line synchronizing signal being connected to outputs of said control circuit via a first delay device and logic gates, one of these outputs being connected to an input of a second delay device, outputs of which are connected to outputs of the control circuit, the input for receiving the field synchronizing signal being connected to an output of the control circuit via a frequency-division circuit, having a division factor equal to two and being arranged in series with a logic gate and input of which is connected to an output of the second delay device.

6. A television imaging panel as claimed in claim 5, wherein the first delay device is constructed as a series-in, parallel-out shift register.

7. A television imaging panel as claimed in claim 5 wherein the second delay device comprises series-arranged flip-flops.

* * * * *

UNITED STATES PATENT AND TRADEMARK OFFICE
CERTIFICATE OF CORRECTION

PATENT NO. : 4,319,279
DATED : March 9, 1982
INVENTOR(S) : FRANCISCUS H.M. BERGEN ET AL It is certified that error appears in the above-identified patent and that said Letters Patent are hereby corrected as shown below:

Claim 5, line 13  change "and" to --an--

Signed and Sealed this

Twenth-eighth Day of September 1982

[SEAL]

Attest:

GERALD J. MOSSINGHOFF

Attesting Officer   Commissioner of Patents and Trademarks